Sept. 17, 1963  A. T. ZAHORSKI  3,104,194
PANEL STRUCTURE

Filed Jan. 30, 1962  2 Sheets-Sheet 1

INVENTOR.
ADAM T. ZAHORSKI
BY C. G. Stratton
ATTORNEY

Sept. 17, 1963 A. T. ZAHORSKI 3,104,194
PANEL STRUCTURE
Filed Jan. 30, 1962 2 Sheets-Sheet 2
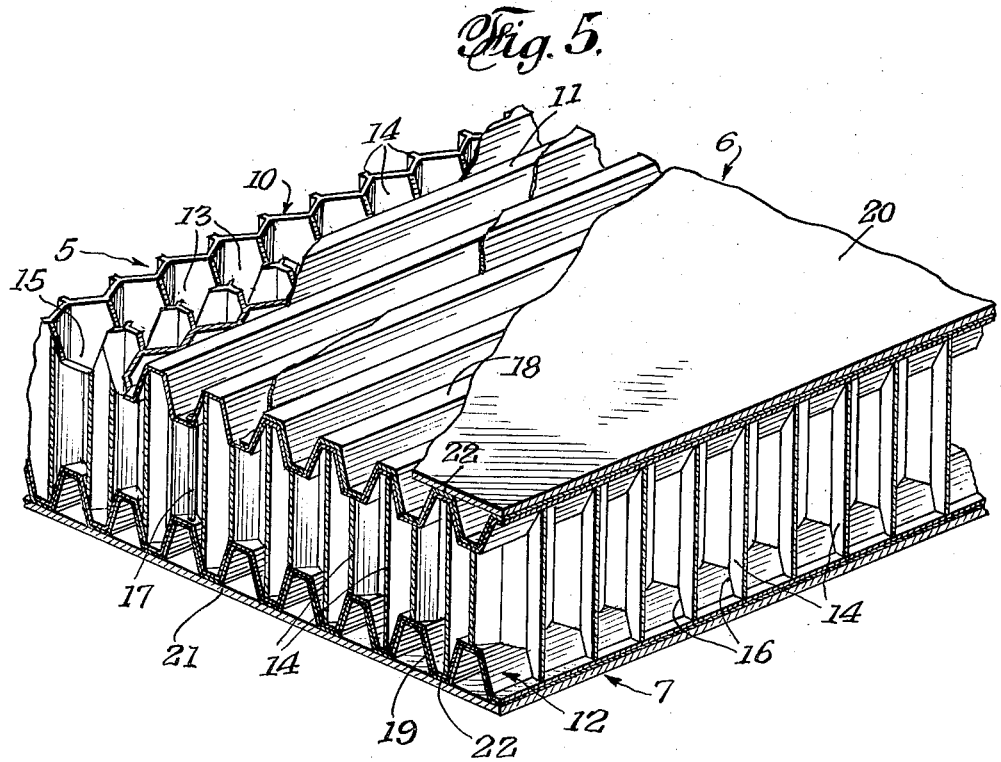
INVENTOR.
ADAM T. ZAHORSKI
BY C. G. Stratton
ATTORNEY

United States Patent Office 3,104,194
Patented Sept. 17, 1963

3,104,194
PANEL STRUCTURE
Adam T. Zahorski, Los Altos, Calif.
(2368 Adele Ave., Mountain View, Calif.)
Filed Jan. 30, 1962, Ser. No. 169,883
7 Claims. (Cl. 161—51)

This invention relates to a panel structure that is characterized by light weight and inordinately great strength in relation to its weight. The present structure is particularly adapted for use in the aviation and missile fields where weight-strength factors are of optimum importance.

An object of the present invention is to provide a panel structure having the above desired characteristics and which is adapted to be inexpensively fabricated of thin-walled metal components and even, in part, of inner wood, plastic or other light yet strong materials, and yet have rigidity and strength comparable to panels that are more massive and substantially heavier.

Another object of the invention is to provide a fabricated panel structure of the so-called sandwich type in which the core thereof is of novel and inexpensive lightweight design and the fabrication of the components is inexpensively performed.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, preferred embodiments of the present invention, which are given by way of illustration or example only.

In the drawing, like reference characters designate similar parts in the several views.

FIG. 5 is a perspective view of the panel shown in FIGS. 1 and 2.

Figure 4:
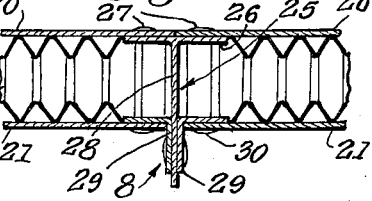
FIG. 4 is a cross-sectional view showing means to effect an edge-to-edge connection of two panels.

The present panel structure comprises, generally, an inner core 5, and outer or skin components 6 and 7 which are preferably similar. FIG. 4 shows means 8 for connecting contiguous edges of two panels.

The inner core 5 comprises a core element 10, and similar oppositely applied corrugated members 11 and 12.

Figure 1:
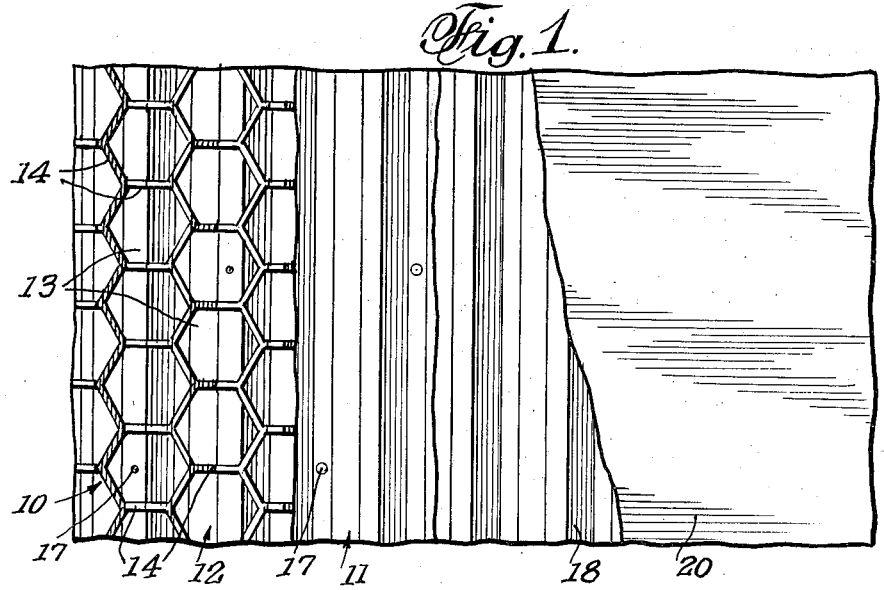
FIG. 1 is a plan view of a portion of a panel according to the present invention, the elements or components of the panel being broken away in successive stages to reveal the inner construction.
Figure 2:
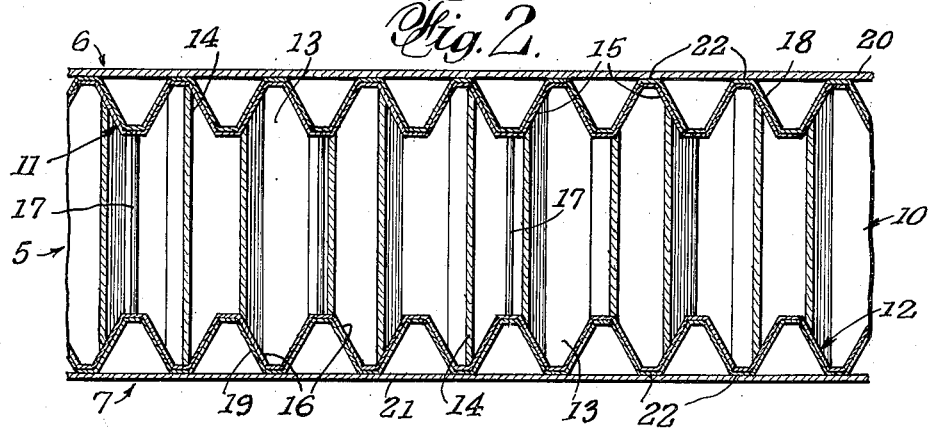
FIG. 2 is a cross-sectional view thereof as seen from the lower edge of FIG. 1.

The core element 10 is preferably of honeycomb construction and may be advantageously made of sheet metal, plastic, wood or other rigid lightweight material. As best seen in FIG. 1, the honeycomb form provides through openings 13 that extend through the opposite sides of said element. The classic honeycomb hexagonal structure shown is preferred although the core element may have other structural forms, such as square, rectangular, circular, octagonal and combinations thereof. Regardless of the honeycomb form used, the core element has transverse walls 14 that define the openings 13, the same imparting great compressive strength to element 10 against forces applied to the opposite sides of said element. According to the invention, the opposite sides of said core element are provided with corrugations 15 and 16 which may extend in the same direction, as in FIG. 2, be transversely arranged, as in FIG. 3, or have any desired angular relationship. In the present case, said corrugations have the shape of truncated equilateral longitudinally spaced triangles, although other shaped corrugations may be used. These corrugations 15 and 16 may be formed in any suitable manner, as by cutting or squashing.

The corrugated members 11 and 12 are preferably formed of sheet metal to have corrugations that conform to the corrugations 15 and 16 and fit, respectively, thereinto. It is clear that said members 11 and 12 have engagement with the opposite end edges of the core element 10, thereby closing the opposite ends of the openings 13 in said element.

The core element 10 and corrugated members 11 and 12 may be held in assembly by rod or wire members that extend through the openings 13. In this case, wire-type bolts 17 connect the opposite members 11 and 12, it being clear that the same are exemplary and may be in the form of weaving wires that pass back and forth through the openings 13 and draw the members toward each other against the opposite corrugated sides of the core element 10. In the above manner, the core 5 comprises an enclosed mechanical assembly that is is retained by wires 17.

The outer or skin components 6 and 7 each comprises a corrugated member respectively 18 and 19, and skin members respectively 20 and 21. The respective members 18 and 19 have corrugations of a size and shape to fit the corrugations of the members 11 and 12. The respective members 18 and 20, and 19 and 21, are permanently secured together as by spot welding, soldering or the like, at 22. The skin members 20 and 21 are preferably flat, as shown.

The above-described core 5 and outer components 6 and 7 are fastened together in a permanent assembly by means of a suitable adhesive, epoxy resin, for instance, applied between the mating faces of the corrugated members 11 and 18 on one side, and 12 and 19 on the opposite side.

Figure 3:
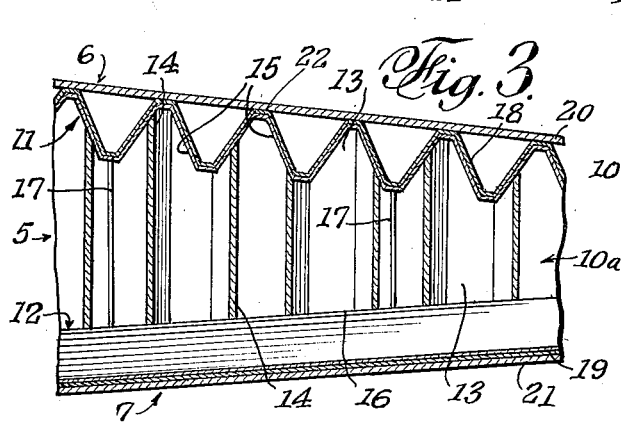
FIG. 3 is a similar cross-sectional view of a modification.

It will be understood that the panel may have a tapered form as in FIG. 3 and that the taper may be a simple one as shown or a compound taper in two transverse directions.

While the corrugations at the opposite sides of the structure are preferably alike and on the same increment of pitch, they may be different and/or vary in pitch, if desired. Also, the core 5 may be formed to be on a curve, longitudinally. The outer components 6 and 7, in such case, will bend to conform to provide an arcuate panel structure in other respects similar to the flat panel structure that is illustrated.

The means 8 is here shown as a T-member 25 in which the flange 26 thereof is secured, as by rivets 27, to the edge-abuted outer skins 20, and the web 28 extends between adjacent panel structures and mounts oppositely directed angles 29 to which the outer skins 21 are secured by rivets 30.

The above also describes a novel method for connecting the components of a panel structure having a honeycomb core.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described this invention, what is claimed and desired to be secured by Letters Patent is:

1. A panel structure comprising
   (a) a honeycomb core element having corrugations on the opposite sides thereof,
   (b) a corrugated sheet member engaged with the corrugations on each said core side,
   (c) wire members extending through the core element and attached to the sheet members to hold the latter against the opposite sides of the core element, and
   (d) outer components having corrugations that fit the corrugations of the sheet members and adhesively secured thereto.

2. A panel structure according to claim 1 in which the core element is of uniform depth between its corrugated sides.

3. A panel structure according to claim 1 in which the core element, between its corrugated sides, is tapered.

4. A panel structure comprising
   (a) a honeycomb core element having corrugations on the opposite sides thereof,
   (b) a corrugated sheet member engaged with the corrugations on each said core side,
   (c) wire members extending through the core element and attached to the sheet members to hold the latter against the opposite sides of the core element,
   (d) an outer component applied to each corrugated sheet member, each said component comprising a sheet member with corrugations to fit the corrugations of the first mentioned sheet member, and a skin member permanently secured to each respective second-mentioned sheet member, and
   (e) means applied between the mating faces of the respective first and second corrugated members to secure the same together.

5. A panel structure according to claim 4 in which the latter means is an adhesive.

6. A panel structure according to claim 4 in which the corrugations in the first and second corrugated members on one side of the core element are parallel to the corrugations of the first and second members on the opposite side.

7. A panel structure according to claim 4 in which the corrugations in the first and second corrugated members on one side of the core element are at an angle to the corrugations of the first and second members on the opposite side.

References Cited in the file of this patent
UNITED STATES PATENTS
2,814,717    Hardesty _____ Nov. 26, 1957